(12) United States Patent
Craig

(10) Patent No.: US 6,453,600 B1
(45) Date of Patent: Sep. 24, 2002

(54) FISHING PLANER

(76) Inventor: Henry A. Craig, 4314 Parkview Dr., Rapid City, SD (US) 57701

( * ) Notice: Subject to any disclaimer, the term of this patent is extended or adjusted under 35 U.S.C. 154(b) by 0 days.

(21) Appl. No.: 09/737,202

(22) Filed: Dec. 13, 2000

(51) Int. Cl.7 .............................. A01K 95/00
(52) U.S. Cl. ................................... 43/43.13
(58) Field of Search ............... 43/43.13, 43.12

(56) References Cited

U.S. PATENT DOCUMENTS

| | | | |
|---|---|---|---|
| 2,062,718 A | * 12/1936 | Kallberg | 43/43.13 |
| 3,543,431 A | 12/1970 | Olds | 43/43.13 |
| 3,708,904 A | 1/1973 | Zaharis | 43/43.13 |
| 3,898,759 A | 8/1975 | Jensen | 43/43.13 |
| 3,971,254 A | 7/1976 | Craig | 43/43.13 |

* cited by examiner

*Primary Examiner*—Kurt Rowan
(74) *Attorney, Agent, or Firm*—Gene R. Woodle

(57) ABSTRACT

Embodiments of a fishing planer are disclosed which may be used to troll a lure at a significant depth beneath the boat without the inconvenience of using an inordinate amount of weight. The fishing planer changes configuration to rise if a fish strikes the lure or if the lure becomes snagged and automatically changes back to diving configuration if the fish gets off or the lure is freed from the snag. The fishing planer also may be configured so that it may be trolled to either side of the boat away from the path of the boat.

1 Claim, 2 Drawing Sheets

FISHING PLANER

BACKGROUND OF THE INVENTION

1. Field of the Invention

The present invention relates generally to trolling with a fishing pole and line and more specifically to devices for getting a trolled lure to a significant depth without the use of an inordinate amount of weight.

2. Background Information

In the United States and throughout the world, a significant number of fisherman believe they fish most successfully when pulling a lure or bait with a boat or trolling. (For purposes of this application, any lure, bait, or other fish attractor will be referred to as a lure.) Unless a very long line is used or a great amount of weight is attached to the line, the towing action of the boat tends to cause the trolled lure to be pulled near the surface of the water, and in many cases the fisherman desires that the lure be fished at a greater depth, often as close to the bottom as possible.

A number of devices have been invented which may be used to allow a lure to be fished at a significant depth. A downrigger, for example, is a very heavy weight which is releasable attached to a fishing line near the lure. When a fish strikes the lure or the lure becomes snagged, the weight releases from the fishing line and the fish played or the fisherman may attempt to release the lure from the snag without the hindrance of the heavy weight attached to the line.

Another type of device for deep trolling of a lure is often referred to as a trolling planer. Trolling planers perform the same function as a downrigger without the inconvenience of the heavy weight. Trolling planers ordinarily include a plane with a leading edge and a following edge. These planers may be configured such that the leading edge is lower than the following edge and the force of the water on the plane causes the plane and attached lure to be forced downward. The patent to Olds (U.S. Pat. No. 3,543,431; Dec. 1, 1970) is an example of this type of planer. Olds includes a horizontal plane with a vertical vane attached to the plane. There is a weight at the front of the plane. The fishing line is attached to the vane near forward end and the lure is affixed to the plane at its rearward end. The attachment point for the lure may be offset from the vane. The weight on the plane causes the leading edge of the plane to ride lower than the following edge and the forward motion of the boat causes the plane to dive. When a fish strikes the lure, the offset causes the plane to flip over and the pull of the boat then causes the plane to rise.

Fishermen attempting to troll a lure face a number of problems. Perhaps the most significant is to find a method of getting the lure to a significant depth without the use of inconveniently heavy weights.

Another significant problem which arises for such fishermen is the necessity of resetting a depth controller after a fish strikes the lure or the lure becomes snagged. When a downrigger is used, the heavy weight releases when a fish strikes; but, if the fish gets off, the entire rig must be pulled to the surface and reset before fishing may be resumed. A number of known trolling planers have a similar difficulty. They have a release mechanism which changes the planer from diving mode to rising mode when a fish strikes the lure or the lure becomes tangled, but they require the fisherman to pull the planer to the surface and reset the release mechanism before fishing can be resumed.

Another problem which arises for such fishermen is the need to be able to vary the depth at which the lure is trolled.

Another problem faced by fishermen when trolling a lure is that known downriggers or trolling planers require that the lure be fished directly behind the boat. In many instances it is desirable that the lure be fished to one side or the other of the path of the boat. For example, if there were two fishermen, it might be desirable for one to fish with the lure away from the path of the boat on one side and for the other to fish with the lure away from the path of the boat on the other side.

The invention presented in the present application is believed to solve, in a simple and effective fashion, problems which have long plagued fishermen desiring to troll a lure at a significant depth: a fishing planer which causes a lure to dive to an appropriate depth without the use of an inordinate amount of weight, which allows the fisherman to continue to fish if a fish strikes the lure and gets away or the lure becomes snagged without having to bring the planer to the surface and reset it, which allows the fisherman to adjust the depth at which the lure is trolled, and which allows the fisherman to troll the lure on a path away from the path of the boat.

The fishing planer of the instant invention is believed to solve all of the above problems which arise for fishermen trolling a lure. The fishing planer includes a plane with a leading edge and a following edge. The fishing planer is configured such that the leading edge is lower than the following edge and, in diving mode, the force of the water on the plane causes the planer to be forced toward the bottom. The planer is also configured such that, in rising mode, if a fish strikes the lure or the lure is snagged; the leading edge is higher than the following edge and the fishing planer is forced upward. The fishing planer also automatically resets if the fish gets away or the snag is freed. The planer may also be adjusted so that the diving angle may be changed. The fishing planer of the instant invention may also be adjusted so that in addition to diving, the planer is forced away from the path of the boat either on one side or the other.

The ideal fishing planer should cause a lure to dive to an appropriate depth without the use of an inordinate amount of weight. The ideal fishing planer should also allow the fisherman to continue to fish if a fish strikes the lure and gets away or the lure becomes snagged without having to bring the planer to the surface and reset it. The ideal fishing planer should allow the fisherman to adjust the depth at which the lure is trolled. The ideal fishing planer should also allow the fisherman to troll the lure on a path away from the path of the boat. The ideal fishing planer should also be simple, rugged, inexpensive, and easy to use.

SUMMARY OF THE INVENTION

The fishing planer of the instant invention includes a plane which has a generally rectangular shape and a leading edge and a following edge. A receiver is attached to the bottom of the plane at the center of the plane. A threaded bolt is screwed into a threaded hole in the receiver such that it is perpendicular to the following edge of the plane. The bolt is firmly affixed within the receiver so that is may not be unthreaded. A threaded bracket is threaded onto the bolt between the receiver and the head of the bolt. The bracket is of sufficient length that, when it is perpendicular to the plane, it protrudes above the top surface of the plane. A lock nut is threaded onto the bolt between the bracket and the head of the bolt. The bracket and the lock nut may be twisted to move them along the threads of the bolt to any position between the following edge of the plane and the head of the bolt. The lock nut may be turned toward and against the bracket such that it acts to hold the bracket firmly in any position along the length of the bolt.

A lure ring having an inside diameter slightly greater than the outside diameter of the bolt is interposed around the bolt between the lock nut and the head of the bolt. There is a hole near the top of the bracket and a bracket ring attached through this hole. A line connector is attached to the bracket ring and the fishing line is connected to the line connector. A lure connector is attached to the lure ring and the lure is attached to the lure connector by a lure line.

In operation, the fishing line is attached to the line connector and the lure is attached to the lure line. The weight of the plane is sufficient such that the leading edge of the plane is lower than the following edge of the plane. As the boat pulls the fishing planer through the water, the force of the water on the top surface of the plane forces the fishing planer to dive (diving mode). When the fishing planer reaches the appropriate depth the upward force of the fishing line and the downward force on the top surface of the plane reach equilibrium and the fishing planer is pulled through the water at approximately the same depth beneath the boat. The lure is pulled behind the planer and the weight of the lure causes it to be below the level of the fishing planer. If a fish strikes the lure or the lure becomes snagged, the head of the bolt is pulled downward which, in turn, causes the leading edge of the plane to become higher than the following edge. In this rising mode, the force of the water acts on the bottom surface of the plane and causes the plane to rise. If the fish gets away or the snag is freed, the leading edge of the plane resumes its downward position and the fishing planer switches to diving mode until it again reaches the appropriate depth and the fisherman may resume fishing.

The bracket may be moved and affixed by the lock nut either toward the plane or toward the head of the bolt. As the bracket is moved away from the plane, the diving angle of the plane increases. Thus, the fishing planer of the instant invention may be adjusted such that, at the same boat speed, it may be fished at a variety of depths. In addition, the fishing planer may be fished at the same depth at a variety of boat speeds.

The bracket may also be positioned such that it is not perpendicular to the top surface of the plane. If the bracket is positioned offset from the perpendicular, the force of the water acting on the top surface of the plane not only forces the fishing planer to dive; but also forces the fishing planer away from the path of the boat.

One of the major objects of the present invention is to provide a fishing planer which causes a lure to dive to an appropriate depth without the use of an inordinate amount of weight.

Another objective of the present invention is to allow the fisherman to continue to fish if a fish strikes the lure and gets away or the lure becomes snagged without having to bring the fishing planer to the surface and reset it.

Another objective of the present invention is to allow the fisherman to adjust the depth at which the lure is trolled.

Another objective of the present invention is to allow the fisherman to troll the lure on a path away from the path of the boat.

Another objective of the present invention is to provide a fishing planer which is simple, rugged, inexpensive, and easy to use.

These and other features of the invention will become apparent when taken in consideration with the following detailed description and the drawings.

DESCRIPTION OF A PREFERRED EMBODIMENT

Figure 1:
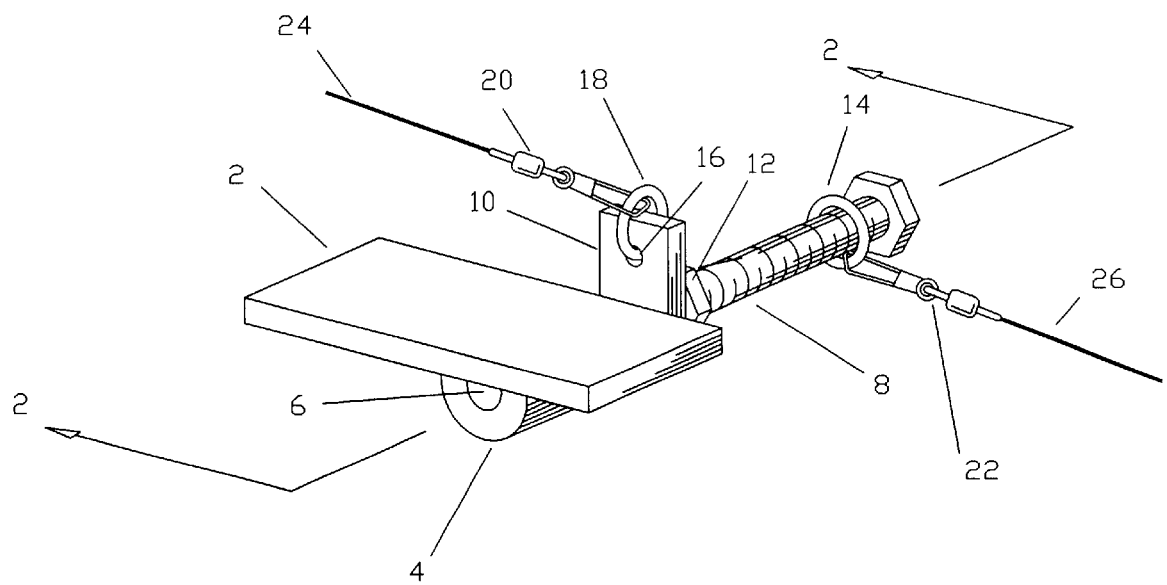
FIG. 1 is a perspective view of the fishing planer of the instant invention.

Referring to the drawings, FIGS. 1 through 5, there is shown a preferred form of the fishing planer embodying the present invention. The fishing planer of the instant invention may be used to troll a lure at an appropriate depth and which automatically allows resumption of fishing at that depth if the a fish strikes the lure and gets away or if the lure is snagged and the snag is freed. The fishing planer also may be adjusted for fishing at various depths or for trolling the lure away from the path of the boat.

Referring to FIG. 1, a perspective view of the fishing planer of the fishing planer of the instant invention is shown. A plane 2 is provided which has a leading edge 3, a following edge 5, a flat top surface 7, a bottom surface 9, and two side edges 11. Although other shapes having a flat top surface 7 would work, the plane 2 has a generally rectangular shape with the following and leading edges being longer than the side edges 11. A receiver 4 is affixed to the bottom surface 9 of said plane 2 along the center of the bottom surface 9 of said plane 2. A threaded receiver hole 6 passes through the receiver 4 and is parallel to the side edges 11 of said plane 2. A threaded bolt 8 is screwed into said receiver 4 such that the end of the bolt 8 is within said receiver 4 and the head of said bolt 8 is away from said plane 2. Although a bolt (said bolt 8) is described in the preferred embodiment of the instant invention, a number of other attachment elements could be used to perform the same function as said bolt 8 such as a rod or screw! Said bolt 8 is permanently affixed within said receiver 4 by glue, solder, or similar means. A bracket 10 is threaded onto said bolt 8 between said receiver 4 and the head of said bolt 8. The bracket 10, when positioned perpendicular to the top surface 7 of said plane 2, is of sufficient length that it protrudes upward beyond the top surface 7 of said plane 2. A lock nut 12 is threaded onto said bolt 8 between said bracket 10 and the head of said bolt 8. A lure ring 14, having an inside diameter slightly greater than the outside diameter of said bolt 8 is positioned on said bolt 8 between the lure ring 14 and the head of said bolt 8. The diameter of said lure ring 14 is sufficiently small that said lure ring 14 will not pass over the head of said bolt 8 or said lock nut 12. Note that in manufacture, said bracket 10, said lock nut 12, and said lure ring 14 are placed upon said bolt 8 before said bolt 8 is screwed into said receiver 4.

Still referring to FIG. 1, there is a bracket hole 16 parallel to said bolt 8 through said bracket 10 near the end of said bracket 10 furthest from said bolt 8. A bracket ring 18 is inserted through the bracket hole 16. A line connector 20 is removable attached to the bracket ring 18 and a lure connector 22 is removably attached to said lure ring 14. A fishing line 24 is attached to the line connector 20. Any lure (not shown) which may be a lure, hook, bait, or other fish attractor may be attached to the free end of a lure line 26 with the other end of the lure line 26 being attached to said lure connector 22.

Figure 2:
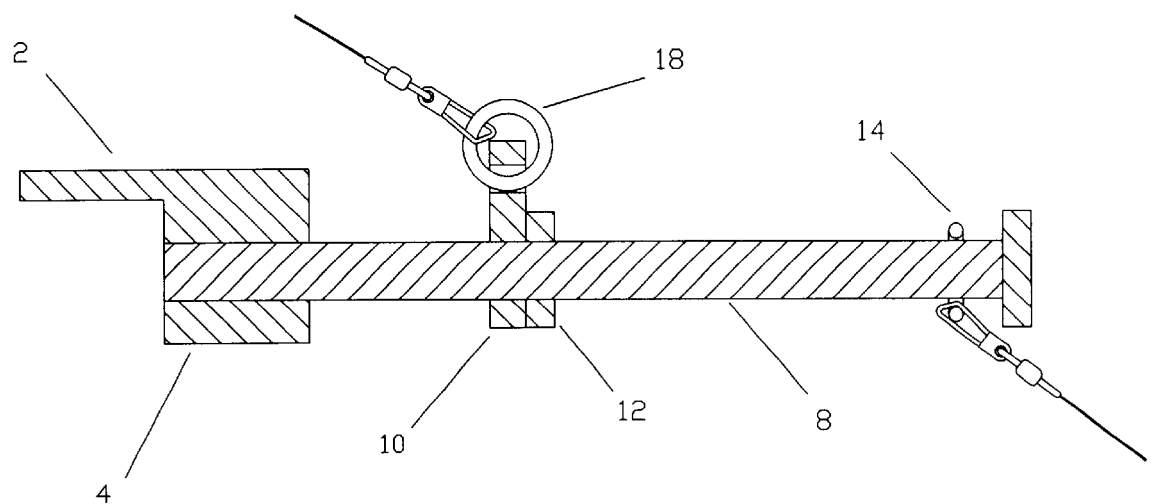
FIG. 2 is sectional view of the fishing planer of the instant invention taken along line 2—2 of FIG. 1.

Referring now to FIG. 2, sectional view of the fishing planer of the instant invention taken along line 2—2 of FIG. 1 is shown. This view is provided to show the configuration of the various elements of the fishing planer including said plane 2, said receiver 4, said bolt 8, said bracket 10, said lock nut 12, said lure ring 14, and said bracket ring 18.

Figure 3:
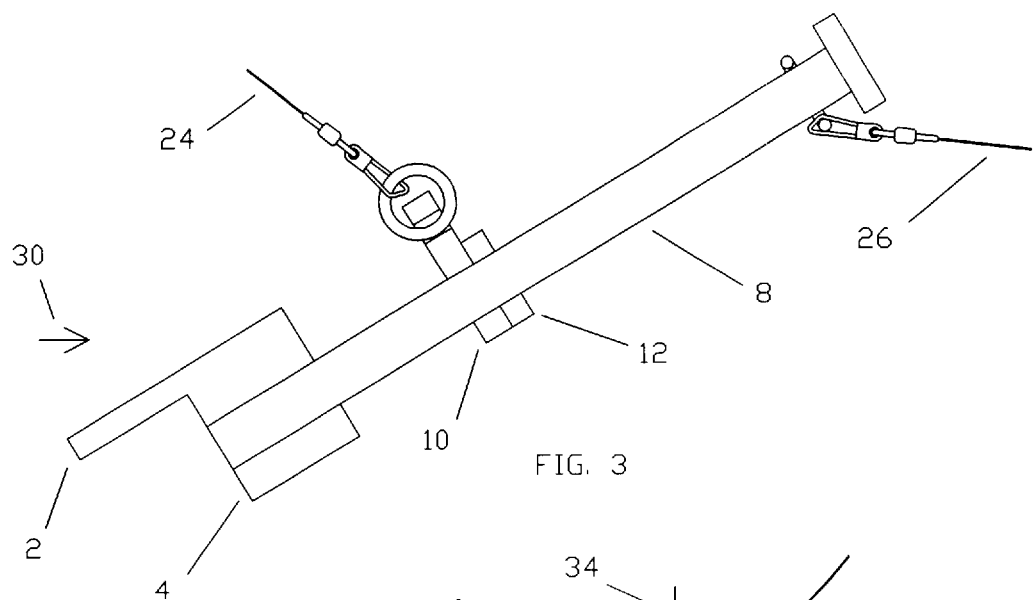
FIG. 3 is a side view of the fishing planer of the instant invention in diving mode.

Now referring to FIG. 3, a side view of the fishing planer of the instant invention in diving mode is shown. This view shows the fishing planer in the position in which it is fished. The weight of said plane 2 and said receiver 4 is sufficient that the leading edge 3 of said plane 2 is lower that the following edge 5 of said plane 2. As the fisherman begins to fish and the boat moves forward, the force of the water (indicated by an arrow 30) pushes against the top surface 7 of said plane 2 and forces the fishing planer to dive deeper into the water. The fishing planer continues to dive until the upward pull of said fishing line 24 reaches equilibrium with the downward force of the water acting upon the top surface 7 of said plane 2. At this point the fishing planer is pulled through the water with little variation in depth. Said bracket 10 may be positioned at nearly any point along the length of said bolt 8 and locked in place by tightening said lock nut 12 against said bracket 10. If said bracket 10 is positioned close to said plane 2 the diving angle and, thus, the equilibrium depth, of the fishing planer is less than it would be if said bracket 10 is positioned further away from said plane 2. Therefore, by adjusting the position of said bracket 10, the fishing planer may be fished at a variety of depths at the same boat speed or fished at the same depth at a variety of boat speeds. Many fisherman believe that fishing success often depends upon trolling speed and fishing depth.

Figure 4:
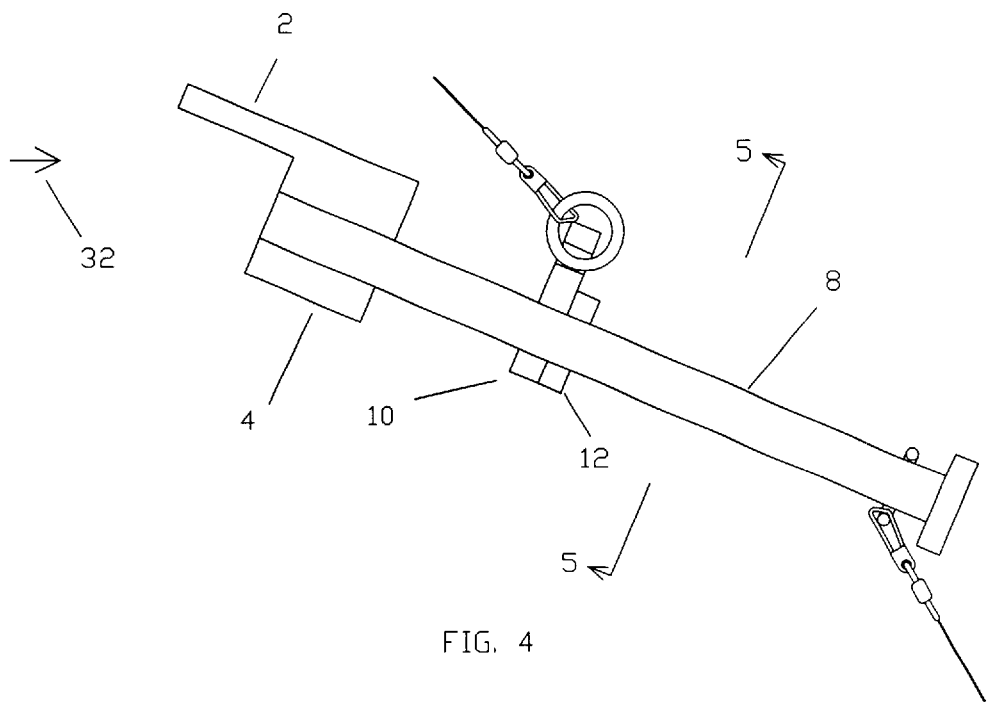
FIG. 4 is a side view of the fishing planer of the instant invention in rising mode.

Referring now to FIG. 4, a side view of the fishing planer of the instant invention in rising mode is shown. This figure shows the position and action of the fishing planer if a fish strikes the lure or the lure is caught in a snag near the bottom. If a fish strikes the fishing planer and moves downward or if the lure is caught in a snag, the downward pull of the fish or the snag is ordinarily sufficient to overcome the weight of said plane 2 and said receiver 4 and the fishing planer assumes a position with the leading edge 3 of said plane 2 higher than the following edge 5 of said plane 2. The force of the water (indicated by an arrow 32) now acts upon the bottom surface 9 of said plane 2 and forces the fishing planer upward which is referred to as rising mode. This upward action helps the fisherman to play and land the fish or to free the lure from the snag. If the fish gets free from the lure or the lure is freed from the snag, the weight of said plane 2 and said receiver 4 are, again, sufficient to pull the leading edge 3 of said plane 2 lower than the following edge 5 of said plane 2 and the fishing planer returns to diving mode and the position indicated in FIG. 3. This automatic resumption of diving mode allows the fisher man to continue fishing without the necessity of pulling the fishing planer and lure back to the surface.

Figure 5:
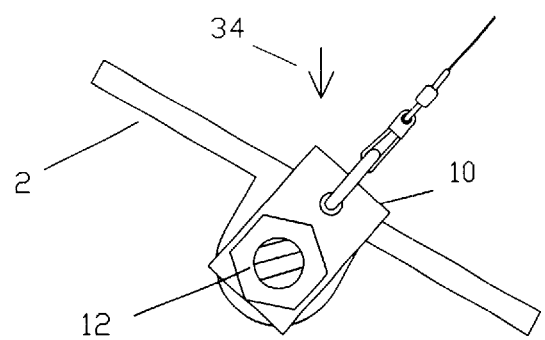
FIG. 5 is a rear sectional view of the fishing planer of the instant invention taken along line 5—5 of FIG. 4.

Now referring to FIG. 5, a rear sectional view of the fishing planer of the instant invention taken along line 5—5 of FIG. 4 is shown. This figure depicts a unique aspect of the fishing planer of the instant invention. If said bracket 10 is positioned as shown in FIG. 1, with said bracket 10 being perpendicular to the top surface 7 of said plane 2, the fishing planer dives directly downward beneath the path of the boat. However, if said bracket 10 is positioned in a position offset from the perpendicular as shown in FIG. 5 and locked in place using said lock nut 10; the force of the water (as indicated by arrow 34) on the top surface 7 of said plane 2 acts not only to force the fishing planer to dive, but also to be pushed away from the path of the boat. As shown in FIG. 5 with the top of said bracket 10 to the right of perpendicular to the top surface 7 of said plane 2, the fishing planer will travel along a path which is to the left of the path of the boat when looking toward the rear of the boat. Conversely, if the top of said bracket 10 is positioned to the left of perpendicular to the top surface 7 of said plane 2, the fishing planer will travel along a path which is to the right of the path of the boat when looking toward the rear of the boat. This unique feature of the fishing planer is valuable in a number of different situations. For example, some fishermen believe that the boat and motor moving through the water disturb fish and that they will be more successful trolling a lure away from the path of the boat. In addition if there are two fishermen fishing from the same boat, it may be more effective for one to fish on one side of the path of the boat and for one to fish on the other side of the path of the boat rather than having them both fish along the path of the boat.

In the preferred embodiment of the fishing planer of the instant invention, all parts and elements, except those specifically mentioned below, are conventional and made from stainless steel; but other materials having the same strength, weight, resistance to oxidation, etc. could be used. Said plane 2 and said receiver 4 are cast lead, but other materials having similar density and other properties could be used.

While preferred embodiments of this invention have been shown and described above, it will be apparent to those skilled in the art that various modifications may be made in these embodiments without departing from the spirit of the present invention.

I claim:

1. A fishing planer for use by a fisherman using a fishing line to troll a lure, hook, bait, or other fish attractor behind a boat which comprises:

(1) a plane having a leading edge, a following edge, a top surface, a bottom surface, and two side edges;

(2) an attachment element having two ends, a first end affixed to the plane midway between the two side edges of said plane; the attachment element being perpendicular to said following edge of said plane; said attachment element protruding rearward from the following edge of said plane; and said attachment element having a forward end affixed to said plane and a rearward end away from said plane;

(3) a bracket being movably affixed to said attachment element rearward of said plane and the bracket being of sufficient length that, when said bracket is positioned perpendicular to the top surface of said plane, a top of said bracket protrudes above the top surface of said plane;

(4) locking means capable of releasably locking said bracket in any position along the length of said attachment element rearward of said plane including positions in which said bracket is not perpendicular to the top surface of said plane;

(5) fishing line attachment means for attaching the end of a fishing line to the top of said bracket; and (6) lure attachment means for attaching a lure, hook, bait, or other fish attractor to a second end of said attachment element;

whereby a fisherman may attach a lure, hook, bait, or other fish attractor to a line attached to the lure attachment means and troll the fishing planer behind a boat and the force of the water acting upon the top surface of said plane forces the fishing planer downward either directly beneath the path of the boat or, if said bracket is positioned such that said bracket is not perpendicular to the top surface of said plane, away from the path of the boat.

* * * * *